(12) United States Patent
Morino et al.

(10) Patent No.: US 11,485,159 B2
(45) Date of Patent: Nov. 1, 2022

(54) LIQUID DISCHARGE APPARATUS AND PRINTER

(71) Applicant: Ricoh Company, Ltd., Tokyo (JP)

(72) Inventors: Tetsu Morino, Kanagawa (JP); Takeyuki Kobayashi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 37 days.

(21) Appl. No.: 17/154,023

(22) Filed: Jan. 21, 2021

(65) Prior Publication Data

US 2021/0245534 A1 Aug. 12, 2021

(30) Foreign Application Priority Data

Feb. 6, 2020 (JP) .............................. JP2020-018543

(51) Int. Cl.
*B41J 25/34* (2006.01)
*B41J 2/175* (2006.01)

(52) U.S. Cl.
CPC ..................... *B41J 25/34* (2013.01)

(58) Field of Classification Search
CPC ........................................................ B41J 25/34
See application file for complete search history.

(56) References Cited

U.S. PATENT DOCUMENTS

| 2005/0194730 | A1 | 9/2005 | Nishida et al. |
| 2008/0049087 | A1 | 2/2008 | Morino |
| 2008/0225066 | A1 | 9/2008 | Yorimoto et al. |
| 2008/0225067 | A1 | 9/2008 | Morino et al. |
| 2008/0225068 | A1 | 9/2008 | Morino et al. |
| 2008/0225098 | A1 | 9/2008 | Hagiwara et al. |
| 2008/0231649 | A1 | 9/2008 | Kawabata et al. |
| 2009/0015621 | A1 | 1/2009 | Hirota et al. |
| 2009/0148181 | A1 | 6/2009 | Niihara et al. |
| 2009/0184993 | A1 | 7/2009 | Yorimoto et al. |
| 2009/0185813 | A1 | 7/2009 | Hagiwara et al. |
| 2009/0189937 | A1 | 7/2009 | Naruse et al. |
| 2009/0195606 | A1* | 8/2009 | Hirasawa ............... B41J 2/1623 347/47 |
| 2010/0026742 | A1 | 2/2010 | Morino |
| 2010/0055424 | A1* | 3/2010 | Yoshida ................. B41J 2/2107 428/209 |
| 2010/0149299 | A1 | 6/2010 | Nishida et al. |
| 2010/0177357 | A1* | 7/2010 | Yoshida ............... G06K 15/407 358/3.21 |

(Continued)

FOREIGN PATENT DOCUMENTS

JP 2005-138486 6/2005
JP 2012-006173 1/2012

(Continued)

*Primary Examiner* — Jason S Uhlenhake
(74) *Attorney, Agent, or Firm* — Xsensus LLP (57) ABSTRACT

A liquid discharge apparatus includes an apparatus body, a liquid discharge device configured to discharge a liquid, a carriage in the apparatus body, the carriage configured to movably mount the liquid discharge device, a first storage container detachably attached to the carriage, the first storage container configured to store a first liquid, and a second storage container detachably attached to the apparatus body, the second storage container configured to store a second liquid different from the first liquid.

15 Claims, 7 Drawing Sheets

(56) References Cited

U.S. PATENT DOCUMENTS

| | | |
|---|---|---|
| 2011/0050796 A1* | 3/2011 | Nishida ................ B41J 2/16526 347/29 |
| 2013/0057604 A1 | 3/2013 | Masunaga et al. |
| 2013/0176367 A1 | 7/2013 | Morino et al. |
| 2014/0056625 A1 | 2/2014 | Naitoh et al. |
| 2014/0093288 A1 | 4/2014 | Naitoh et al. |
| 2016/0355007 A1 | 12/2016 | Morino et al. |
| 2017/0100928 A1* | 4/2017 | Namiki ................ B41J 2/2132 |
| 2020/0101740 A1* | 4/2020 | Yamagishi ............ B41J 25/316 |
| 2020/0290387 A1 | 9/2020 | Morino et al. |
| 2020/0369032 A1 | 11/2020 | Morino et al. |

FOREIGN PATENT DOCUMENTS

| | | |
|---|---|---|
| JP | 2014-065293 | 4/2014 |
| JP | 2017-105967 | 6/2017 |
| WO | WO2014/209944 A1 | 12/2014 |

\* cited by examiner

LIQUID DISCHARGE APPARATUS AND PRINTER

CROSS-REFERENCE TO RELATED APPLICATION

This patent application is based on and claims priority pursuant to 35 U.S.C. § 119(a) to Japanese Patent Application No. 2020-018543, filed on Feb. 6, 2020, in the Japan Patent Office, the entire disclosures of which is hereby incorporated by reference herein.

BACKGROUND

Technical Field

Aspect of this disclosure relates to a liquid discharge apparatus and a printer.

Related Art

As a liquid discharge apparatus to discharge a liquid, there is a device that uses a liquid having a high sedimentation such as a white ink.

The liquid discharge apparatus supplies inks of respective colors including the white ink from ink cartridges detachably attached to an apparatus body of the liquid discharge apparatus to liquid discharge heads via supply tubes, respectively. The liquid discharge heads respectively discharge the inks of respective colors supplied from the ink cartridges. The ink cartridge containing the white ink is moved in a main scanning direction.

SUMMARY

In an aspect of this disclosure, a liquid discharge apparatus includes an apparatus body, a liquid discharge device configured to discharge a liquid, a carriage in the apparatus body, the carriage configured to movably mount the liquid discharge device, a first storage container detachably attached to the carriage, the first storage container configured to store a first liquid, and a second storage container detachably attached to the apparatus body, the second storage container configured to store a second liquid different from the first liquid.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Referring now to the drawings, wherein like reference numerals designate identical or corresponding parts throughout the several views, embodiments of the present disclosure are described below.

A printer 1 according to a first embodiment of the present disclosure is described with reference to FIGS. 1 to 7.

Figure 1:
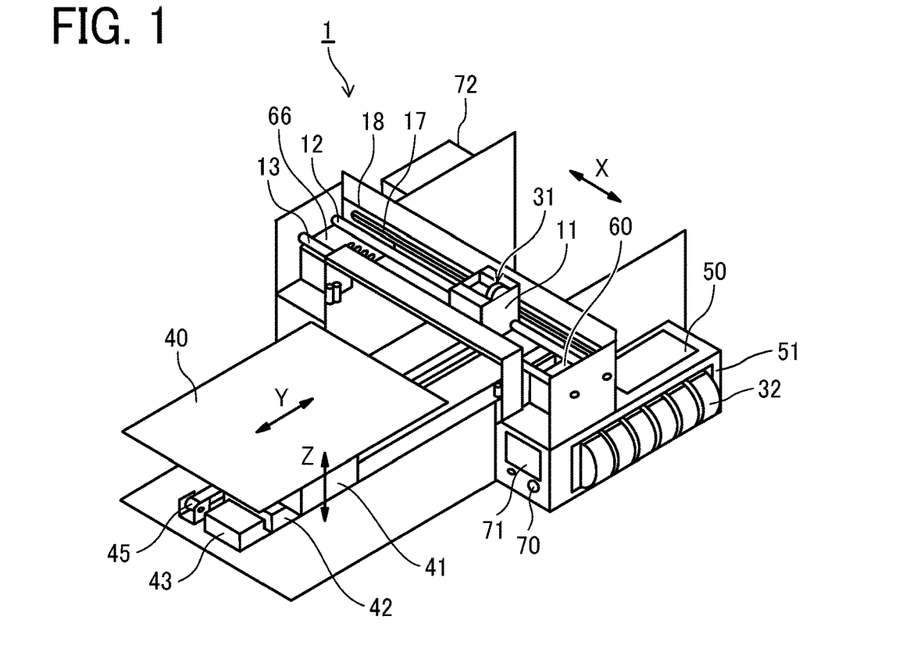
FIG. 1 is a schematic perspective view of a printer according to a first embodiment of the present disclosure.

FIG. 1 is a schematic perspective view of the printer 1 according to the first embodiment of the present disclosure.

Figure 2:
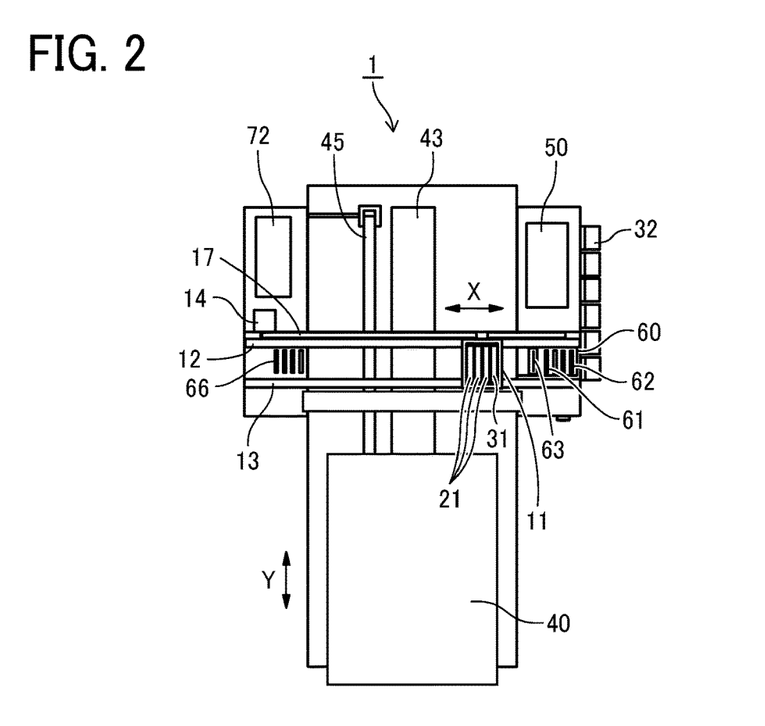
FIG. 2 is a schematic plan view of the liquid discharge apparatus of FIG. 1.

FIG. 2 is a schematic plan view of the printer 1 of FIG. 1.

Figure 3:
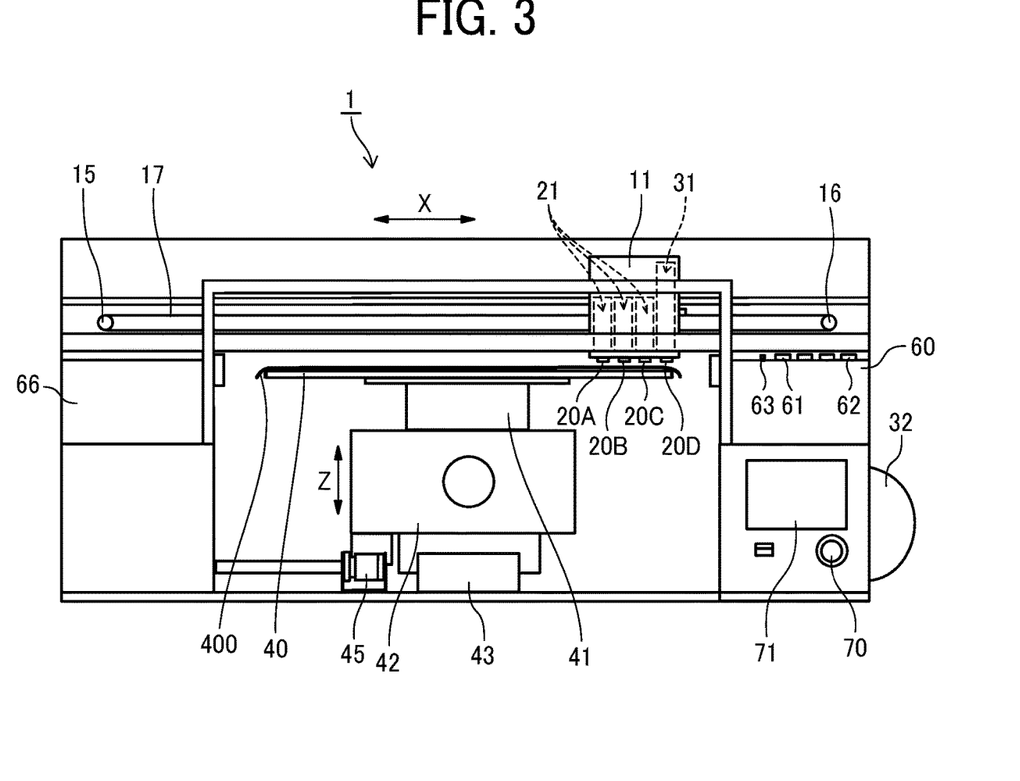
FIG. 3 is a schematic cross-sectional front view of the printer of FIG. 1.

FIG. 3 is a schematic cross-sectional front view of the printer 1 according to the first embodiment of the present disclosure.

Figure 4:
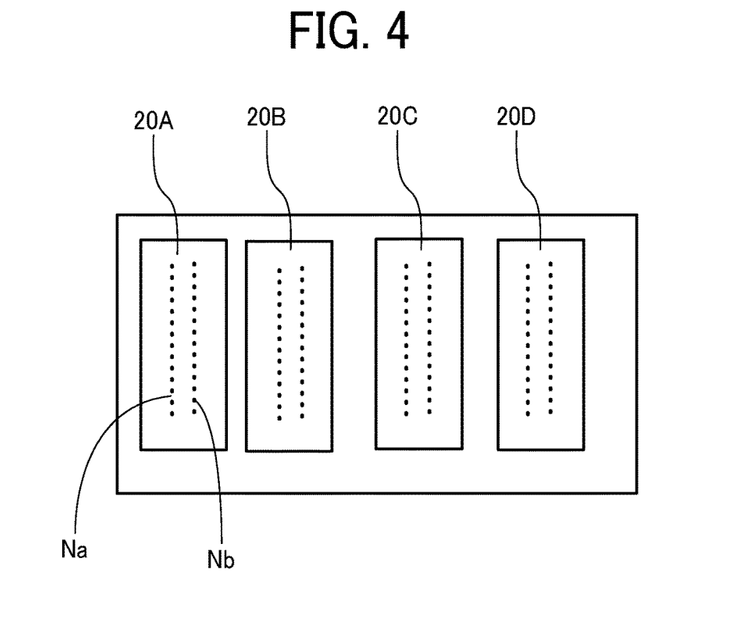
FIG. 4 is a plan view of a carriage viewed from nozzle surfaces of heads.

FIG. 4 is a plan view of a carriage 11 viewed from nozzle surfaces of heads 20 (20A to 20D).

Figure 5A:
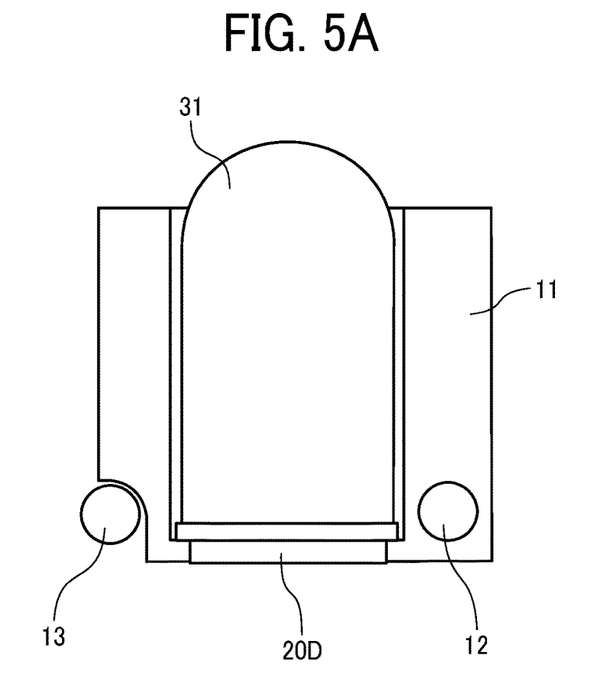
FIGS. 5A and 5B are schematic side views of a first storage container (cartridge) and the carriage of the printer.
Figure 5B:
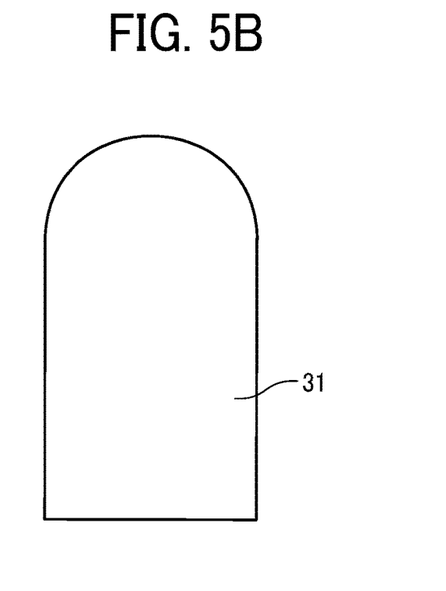

FIGS. 5A and 5B are schematic side views of a first storage container (cartridge 31) of the printer 1.

Figure 6:
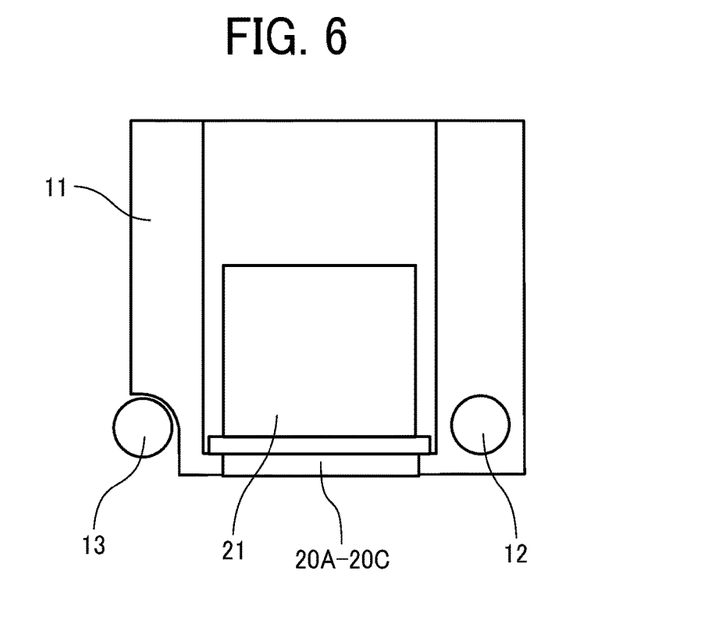
FIG. 6 is a schematic side view of a second storage container (main tank) and a head to which a liquid is supplied from the second storage container (main tank)

FIG. 6 is a schematic side view of a second storage container (main tank 32) and a head 20 (20A to 20C) of the printer 1. The second storage container (main tank 32) supplies a liquid to the head 20 (20A to 20C).

Figure 7:
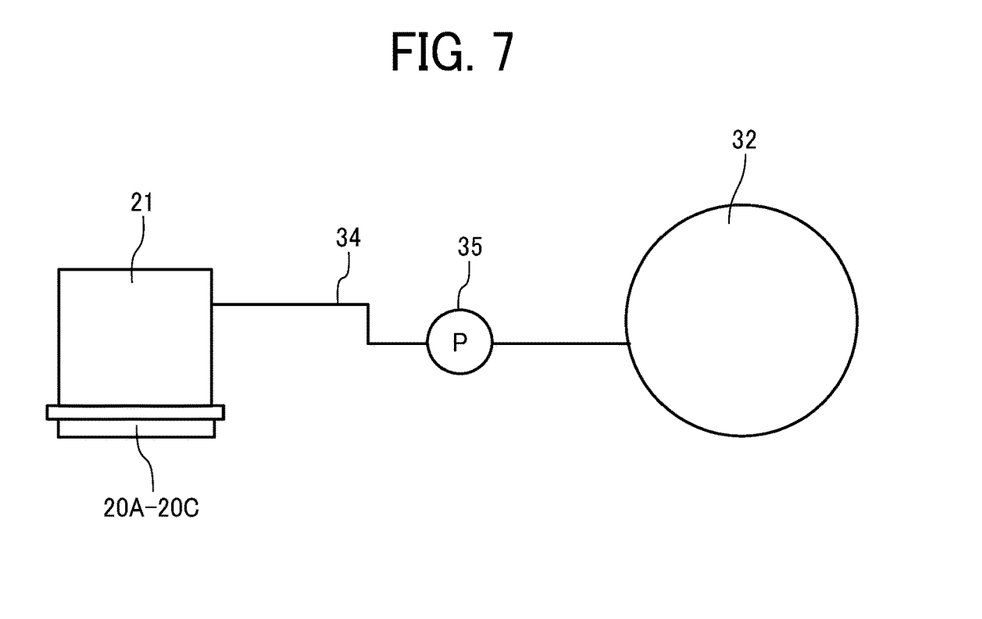
FIG. 7 is a schematic view of a supply system from the second storage container (main tank) to the head of the printer.

FIG. 7 is a schematic view of a supply system from the second storage container (main tank 32) to the head 20 (20A to 20C) of the printer 1.

The printer 1 is a liquid discharge apparatus to discharge a liquid. The printer 1 includes a plurality of heads 20 (20A to 20D), a plurality of sub tanks 21, and the carriage 11. The plurality of heads 20 serves as liquid discharge devices to discharge a liquid. The carriage 11 mounts a cartridge 31.

The guides 12 and 13 holds the carriage 11 such that the carriage 11 is reciprocally movable in a main scanning direction indicated by arrow "X" in FIG. 1. To move and scan the carriage 11 in the main scanning direction X, the carriage 11 is coupled to a timing belt 17 is stretched between a drive pulley 15 rotated by a main scanning motor 14 and a driven pulley 16. As the main scanning motor 14 drives and rotates the timing belt 17 through the drive pulley 15, the timing belt 17 reciprocally moves the carriage 11 in the main scanning direction X.

The printer 1 includes an encoder sheet 18 arranged along the main scanning direction X. The encoder sheet 18 includes a slit periodically formed on the encoder sheet 18. The carriage 11 includes a reading sensor that reads the slit in the encoder sheet 18. Thus, the printer 1 can detect a position of the carriage 11 in the main scanning direction X from a reading result of the reading sensor.

The printer 1 includes a controller board 50 that controls the head 20 to discharge an ink as a liquid from the head 20 at a timing when the carriage 11 is moved to a discharge position. A position of the carriage 11 is obtained from the reading result of the reading sensor of the carriage 11.

The printer 1 includes plurality (four in FIG. 3) heads 20 (20A to 20D) mounted on the carriage 11. As illustrated in FIG. 4, each of the head 20 (20A to 20D) includes nozzle arrays Na and Nb in each of which a row of nozzles from which a liquid is discharged is arrayed. The nozzles are formed on the nozzle surface of the head 20.

The carriage 11 detachably mounts the cartridge 31 as the first storage container on the carriage 11. The cartridge 31 stores a white ink as a liquid to be supplied to the head 20D.

As illustrated in FIG. 5A, the cartridge 31 mounted on the carriage 11 supplies the liquid to the head 20D (first head). Thus, the cartridge 31 is removable (detachable) from the carriage 11 as a single unit as illustrated in FIG. 5B.

The liquid (also referred to as "first liquid") stored in the cartridge 31 is white ink in the first embodiment. However, the first liquid according to the first embodiment is not limited to the white ink. Specifically, the first liquid stored in the cartridge 31 may contain a metallic pigment such as a liquid (ink) of at least one of gold and silver colors.

The head 20D that discharges the white ink (first liquid) is also referred to as a "first head".

Specific examples of the white ink include the ink that contains titanium oxide, silicon oxide, zinc oxide, aluminum oxide, magnesium oxide, barium sulfate, calcium carbonate, and the like as a white pigment. Instead of materials as described above, the white ink may contain a commercially available processed pigments.

Further, the metallic pigment is preferably a material having a function of providing metallic luster. Examples of the metallic pigment include elemental metals such as aluminum, silver, gold, nickel, chromium, tin, zinc, indium, titanium, and copper, metal compounds (for example, oxides) of the above-described elemental metals, alloys of the above-described elemental metals, and mixtures of the above-described elemental metals.

Further, the first liquid may be an ink that is used infrequently, for example, a spot color ink such as a fluorescent color ink, or a transparent or semitransparent ink, instead of a sedimentation ink. Such a spot color ink is stored in the carriage mountable cartridge so that it becomes easy to change the color of the ink.

Further, the first liquid may be, for example, a pretreatment liquid, a posttreatment liquid, a coating liquid, or the like to be applied to the liquid application target. The first liquid may be accommodated in a carriage-mountable cartridge so that it is easy to change a liquid type of the first liquid.

The carriage 11 mounts the sub tanks 21 on the carriage 11 such that the sub tanks 21 and heads 20A to 20C respectively form a single unit. The sub tanks 21 temporarily store the liquid to be supplied to the heads 20A to 20C.

As illustrated in FIG. 7, a liquid stored in a main tank 32 as the second storage container is supplied to the sub tank 21. The liquid in the main tank 32 is also referred to as "second liquid". The second liquid is a liquid of respective colors such as black (K), cyan (C), magenta (M), and yellow (Y). The second liquid is not limited to one type.

The heads 20A to 20C that discharge the second liquid are collectively referred to as a "second head".

The main tank 32 is the second storage container. The main tank 32 stores a liquid of each color of black (K), cyan (C), magenta (M), and yellow (Y). The main tank 32 is detachably mounted on a tank holder 51 on the apparatus body of th the printer 1. The second liquid in the main tank 32 is fed to the sub tank 21 by a supply channel 34 and a liquid feed pump 35.

As described above, a sedimentation rate of the first liquid (white ink) stored in the cartridge 31 as the first storage container is faster than a sedimentation rate of the second liquid (color ink or the like) stored in the main tank 32 as the second storage container in the first embodiment of the present disclosure.

Thus, a density of the first liquid stored in the cartridge 31 (first storage container) is larger than a density of the second liquid stored in the main tank 32 (second storage container). Further, a density of pigments contained in the first liquid stored in the cartridge 31 (first storage container) is larger than a density of pigments contained in the second liquid stored in the main tank 32 (second storage container).

The printer 1 includes a platen 40 as a holder to hold a fabric 400 as a print target (liquid application target). The printer 1 includes an elevator 41 on which the platen 40 is mounted. A position (height) of the elevator 41 is adjustable in a vertical direction indicated by arrow "Z." The printer 1 includes a slider 42 on which the elevator 41 is mounted. The printer 1 includes a slider rail 43 on which the slider 42 is movably mounted. The slider rail 43 is extended along on a sub scanning direction indicated by arrow "Y" The sub scanning direction Y is perpendicular to the main scanning direction X. Thus, the slider 42 moves along the slider rail 43 in the sub-scanning direction Y A slider 42 is reciprocally movable in the sub scanning direction Y via the timing belt 45 by a sub scan drive mechanism. Reciprocal movement of the slider 42 in the sub scanning direction Y reciprocally moves the platen 40 in the sub scanning direction Y.

The printer 1 includes a maintenance unit 60 to maintain and recover a discharge function the head 20. The maintenance unit 60 is disposed on one side (right-side in FIG. 1) of the printer 1 in the main scanning direction X. The maintenance unit 60 includes a suction cap 61 to cap a nozzle surface of the head 20, a moisture-retention cap 62 to cap the nozzle surface of the head 20 to keep moisture in the nozzles of the head 20, and a wiper 63 to wipe the nozzle surface the head 20. The suction cap 61 is connected to a suction pump serving as a suction device.

The printer 1 includes a discharge receptacle 66 on another end of the printer 1 in the main scanning direction X. The controller board 50 controls the head 20 to discharge the liquid to the discharge receptacle 66 during printing to maintain and recover a discharge function of the head 20.

Further, the printer 1 includes a power button 70, an operation panel 71, a power supply unit 72, and the like.

When the printer 1 prints on a fabric (print target) such as a T-shirt, the fabric 400 is set on the platen 40. Then, the operation panel 71 is operated to completely pulls the platen 40 in a rear direction of the printer 1 by moving the slider 42.

When the platen 40 is fully (completely) pulled inside the printer 1 (end of pull-in operation), the printer 1 becomes a print-data standby state. The printer 1 starts a print operation when the printer 1 receives print data from an external information processing device. Alternatively, the printer 1 may select the print data by the operation panel 71 to start the print operation when the print data is previously stored in the controller board 50.

When the printer 1 starts the print operation, the printer 1 moves the slider 42 to move the platen 40 to a printing start position at which the printer 1 starts the print operation. Then, the printer 1 moves the carriage 11 while discharging a liquid from the head 20 to perform one line of printing on the fabric 400. When the printer 1 prints one line, the printer 1 moves the slider 42 to move the platen 40 by one line. The printer 1 intermittently repeats one scanning movement of the carriage 11 in the main scanning direction X and one movement of the slider 42 in the sub-scanning direction Y to print an image on a desired region on the fabric 400. The printer 1 moves the platen 40 back to a front side (left side in FIG. 1) of the printer 1 to finish the print operation.

A liquid having a high sedimentation property such as white ink is stored in the cartridge 31 and is supplied from the cartridge 31 to the head 20 in the printer 1. The cartridge 31 is a so-called on-carriage cartridge that is detachably mounted on the carriage 11.

On the other hand, liquids, such as black ink and color ink that have non-sedimentation property or lower sedimentation property as compared with white ink, are stored in the main tanks 32 that are detachably attached to the tank holder 51 of the apparatus body of the printer 1 (see FIGS. 1 and 2).

Then, the liquid is supplied from the main tank 32 to the sub tank 21 in the vicinity of the head 20 on the carriage 11 via the supply channel 34 such as a supply tube and the liquid feed pump 35. Then, the liquid is temporarily stored in the sub tank 21 and then supplied to the head 20.

Thus, the cartridge 31 (first storage container) directly supplies the first liquid to the head 20 (liquid discharge device) on the carriage 11, and the main tank 32 (second storage container) supplies the second liquid to the head 20 (liquid discharge device) on the carriage 11 via a supply channel 34 (supply tube).

The printer 1 having such a configuration as described above can have a supply system that does not include a supply channel 34 such as a supply tube or include shorter supply channel to supply liquids such as white ink to the head 20. Thus, the printer 1 according to the first embodiment can reduce an amount of wasted ink having sedimentation property when the ink having sedimentation property is replaced with a storage liquid. The storage liquid is also referred to as a filling liquid or a cleaning liquid.

Further, titanium oxide is generally used for white ink. Since white ink has sedimentation property, white ink has to be stirred (agitated) by a regular circulation operation, for example. However, the head 20 and the cartridge 31 are adjacent to each other without having a long supply channel such as a supply tube in the printer 1 according to the first embodiment. Thus, the printer 1 according to the first embodiment has to just stir white ink in the cartridge 31 to prevent sedimentation of white ink so that the printer 1 can have a simple configuration. Further, the printer 1 can move (scan) the carriage 11 to stir (agitate) white ink in the cartridge 31.

Further, an accommodation capacity of the cartridge 31 as the first storage container mounted on the carriage 11 is made smaller than an accommodation capacity of the main tank 32 as the second storage container. Thus, the printer 1 according to the first embodiment can reduce weight of the cartridge 31 on the carriage 11 and thus prevent an increase in weight of entire carriage 11 including the cartridge 31. Thus, the printer 1 according to the first embodiment can reduce a change of weight of the entire carriage 11 due to liquid consumption of white ink in the cartridge 31. Thus, the printer 1 can stably moves the carriage 11.

Conversely, an accommodation capacity of the cartridge 31 as the first storage container mounted on the carriage 11 may be made larger than an accommodation capacity of the main tank 32 as the second storage container.

Compared to a printer that mounts liquid containers of all colors on the carriage 11, the printer 1 according to the first embodiment that mounts a part of liquid containers on the apparatus body can reduce an overall increase in size of the carriage 11 even if a size of the liquid container mounted on the carriage 11 increases.

Particularly, a printer to print a T-shirt or the like as a printing medium consumes a large amount of white ink as a base. The printer 1 according to the first embodiment having above configuration is preferably used for the printer to print a T-shirt or the like.

On the other hand, liquids such as black ink and color ink are supplied from the main tank 32 detachably attached to the tank holder 51 on the apparatus body. Thus, the printer 1 can use the main tank 32 having large capacity for the liquids such as black ink and color ink. The printer 1 can reduce costs of the main tank 32 of the black ink and color ink.

Further, the printer 1 according to the first embodiment does not mount the main tank 32 (second storage container) on the carriage 11 so that the printer 1 can avoid increase in the weight of the carriage 11. Thus, the printer 1 can increase a moving speed of the carriage 11 and increase moving accuracy of the carriage 11 so that the printer 1 can increase the printing speed.

Next, the printer 1 according to a second embodiment of the present disclosure is described with reference to FIGS. 8 to 10.

Figure 8A:
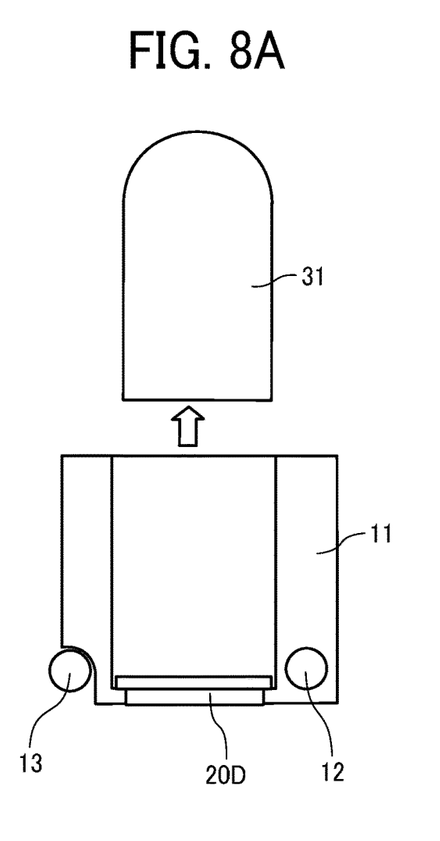
FIGS. 8A and 8B are schematic side views of the carriage and the cartridge illustrating a replacement operation of a storage liquid according to a second embodiment of the present disclosure.
Figure 8B:
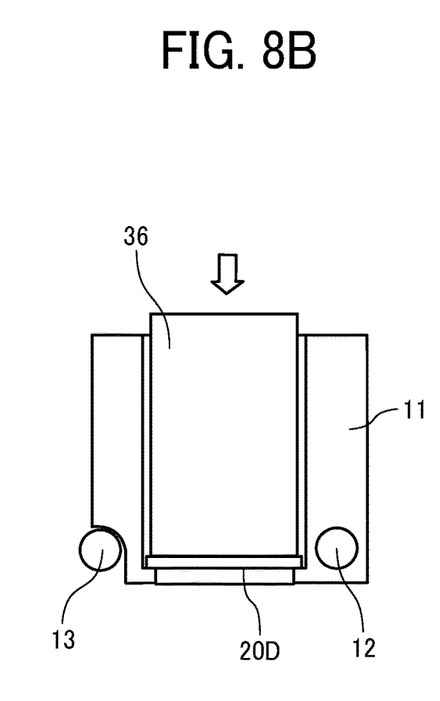

FIG. 8 is a schematic side view of the carriage 11 and the cartridge 31 illustrating a replacement operation of a storage liquid according to the second embodiment of the present disclosure.

Figure 9:
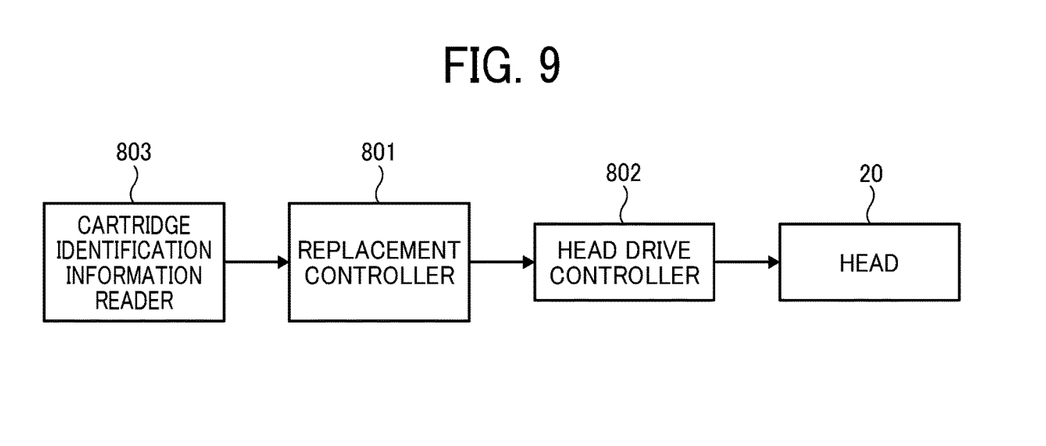
FIG. 9 is a block diagram of a portion related to a control of the replacement operation of the storage liquid of FIG. 8.

FIG. 9 is a block diagram of a portion related to a control of the replacement operation of the storage liquid of FIG. 8.

Figure 10:
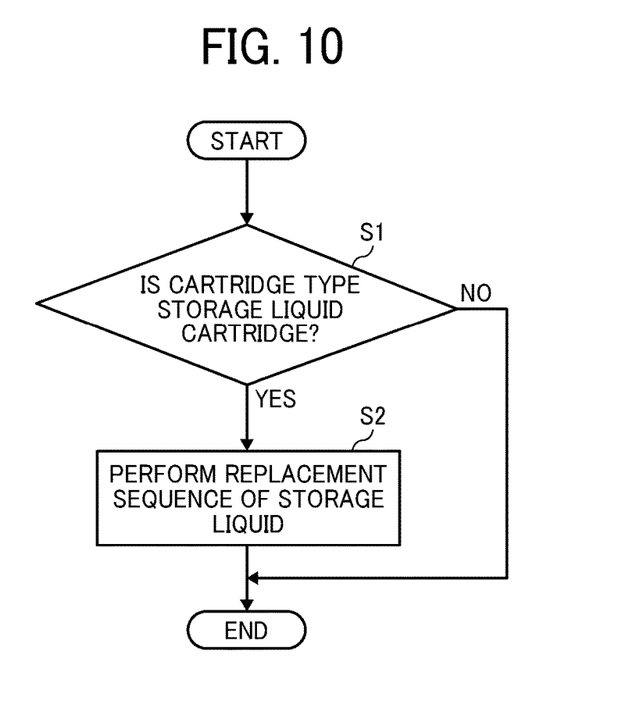
FIG. 10 is a flowchart of the control of the replacement operation by a replacement controller.

FIG. 10 is a flowchart of the control of the replacement operation by the replacement controller.

When the printer 1 is not used for a long period of time, the cartridge 31 containing a liquid such as white ink is removed from the carriage 11 as illustrated in FIG. 8A. Then, as illustrated in FIG. 8B, a storage liquid cartridge 36 is mounted on the carriage 11. The storage liquid cartridge 36 is a third storage container containing the storage liquid as a third liquid. Thus, the printer 1 becomes a state in which the storage liquid in the storage liquid cartridge 36 can be supplied to the head 20D.

As illustrated in FIG. 9, the printer 1 includes a replacement controller 801 and a cartridge identification information reader 803. The replacement controller 801 inputs a reading result of the cartridge identification information reader 803. The cartridge identification information reader 803 reads information of the cartridge 31 connected to the head 20D. Specifically, the cartridge identification information reader 803 reads, for example, the cartridge identification information stored in a memory element such as a radiofrequency identification (RFID) on the cartridges 31 and 36.

The replacement controller 801 controls a head drive controller 802 to drive the head 20D based on the reading result of the cartridge identification information reader 803. Thus, the replacement controller 801 controls the replacement operation to perform a dummy discharge operation to discharge liquids into an interior of the suction cap 61.

With reference to a flowchart in FIG. 10, when the replacement controller 801 starts a cartridge-type identification sequence, the replacement controller 801 determines whether a cartridge type of the cartridge on the carriage 11 is the storage liquid cartridge 36 (step S1). Hereinafter, the step S1 is simply referred to as "S1".

When the cartridge mounted on the carriage 11 is the storage liquid cartridge 36, the replacement controller 801 controls the head drive controller 802 to drive the head 20 to discharge the first liquid from the head 20 into the suction cap 61 to perform a dummy discharge operation as a replacement sequence of the storage liquid (S2). Thus, the first liquid in an inner channel of the head 20 and the supply channel from the storage liquid cartridge 36 to the head 20 is discharged and replaced with the storage liquid. The replacement controller 801 can manage an amount of liquid discharged from the head 20 by a predetermined number of liquid droplets, for example.

As described above, a length of a supply channel from the storage liquid cartridge 36 to the head 20 is shorter than a supply channel 34 to supply the first liquid from the main tank 32 to the head 20 via the supply channel 34. Thus, when the replacement controller 801 replaces the first liquid in the head 20 and the supply channel with the storage liquid, an amount of waste of the first liquid remaining in the supply channel is smaller than an amount waste of the liquid supplied from the main tank 32.

Thus, the storage liquid cartridge 36 (third storage container) is detachably attached to the carriage 11 from which the cartridge 31 (first storage container) has been detached. The storage liquid cartridge 36 (third storage container) stores the storage liquid (third liquid) different from the first liquid and the second liquid.

The replacement controller 801 (circuitry) drives the heads 20 (liquid discharge device) to discharge the first liquid in the head 20 (liquid discharge device) to replace the first liquid in the head 20 (liquid discharge device) with the storage liquid (third liquid) in the storage liquid cartridge 36 (third storage container).

Next, the printer 1 according to a third embodiment of the present disclosure is described with reference to FIGS. 11A and 11B.

Figure 11A:
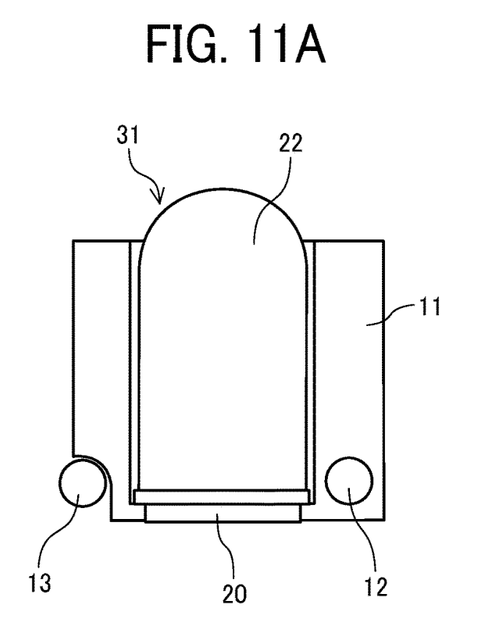
FIGS. 11A and 11B are schematic side views of the carriage and a head-integrated type cartridge according to a third embodiment of the present disclosure.
Figure 11B:
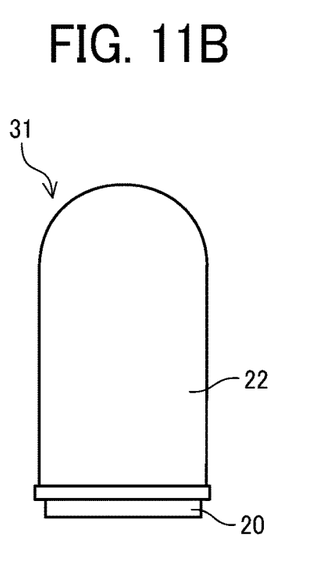

FIGS. 11A and 11B are schematic side views of the carriage 11 and a head-integrated type cartridge 31 according to the third embodiment of the present disclosure.

The cartridge 31 and the head 20 form a single unit as illustrated in FIG. 11B. Thus, the cartridge 31 illustrated in FIG. 11B is also referred to as the "head-integrated type cartridge".

The printer 1 according to the third embodiment uses the cartridge 31 as the first storage container having a configuration in which the head 20 and a container body 22 form a single unit. The container body 22 stores the liquid.

As illustrated in FIG. 11A, when the cartridge 31 mounted on the carriage 11 is replaced, the cartridge 31 together with the head 20 is removed from the carriage 11 as illustrated in FIG. 11B.

Adoption of such the head-integrated type cartridge, the printer 1 according to the third embodiment can replace the cartridge 31 together with the head 20 without changing the liquid color, liquid type, etc. Thus, the printer 1 according to the third embodiment can improve workability to change the color and type of liquid.

Next, the printer 1 according to a fourth embodiment of the present disclosure is described with reference to FIG. 12.

Figure 12:
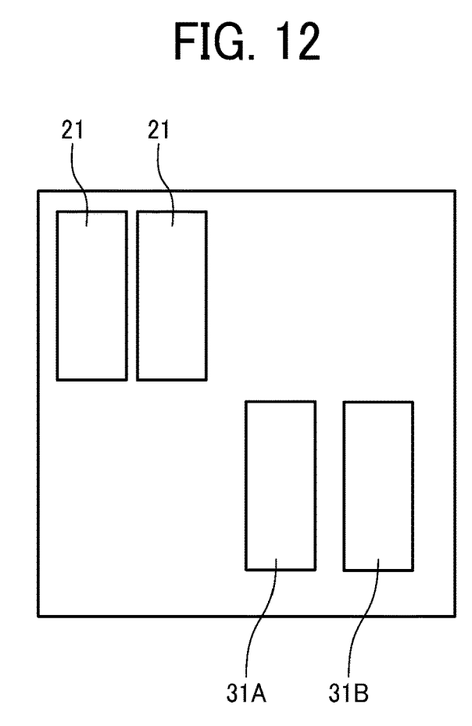
FIG. 12 is a schematic plan view of the carriage according a fourth embodiment of the present disclosure.

FIG. 12 is a schematic plan view of the carriage 11 according to the fourth embodiment of the present disclosure.

The printer 1 according to the fourth embodiment includes two sub tanks 21 and two cartridges 31A and 31B arranged in a staggered manner.

The cartridge 31A is, for example, the first storage container containing white ink. The cartridge 31B is, for example, the first storage container containing transparent ink.

Thus, the sub tanks 21 and the cartridges 31A and 31B may be arranged in the staggered manner. The liquid is supplied from the main tank 32 to the sub tanks 21.

Further, a plurality of cartridges 31 as the first storage container can be mounted on the carriage 11, and the cartridges 31 can be mounted on the carriage 11 according to the required color and type of liquid. Thus, the printer 1 according to the fourth embodiment can easily change a type of liquid supplied from the cartridge 31 on the carriage 11. Thus, the carriage 11 is mountable a plurality of first storage containers (cartridges 31) including the first storage container (cartridge 31).

Next, the printer 1 according to a fifth embodiment of the present disclosure is described with reference to FIG. 13.

Figure 13:
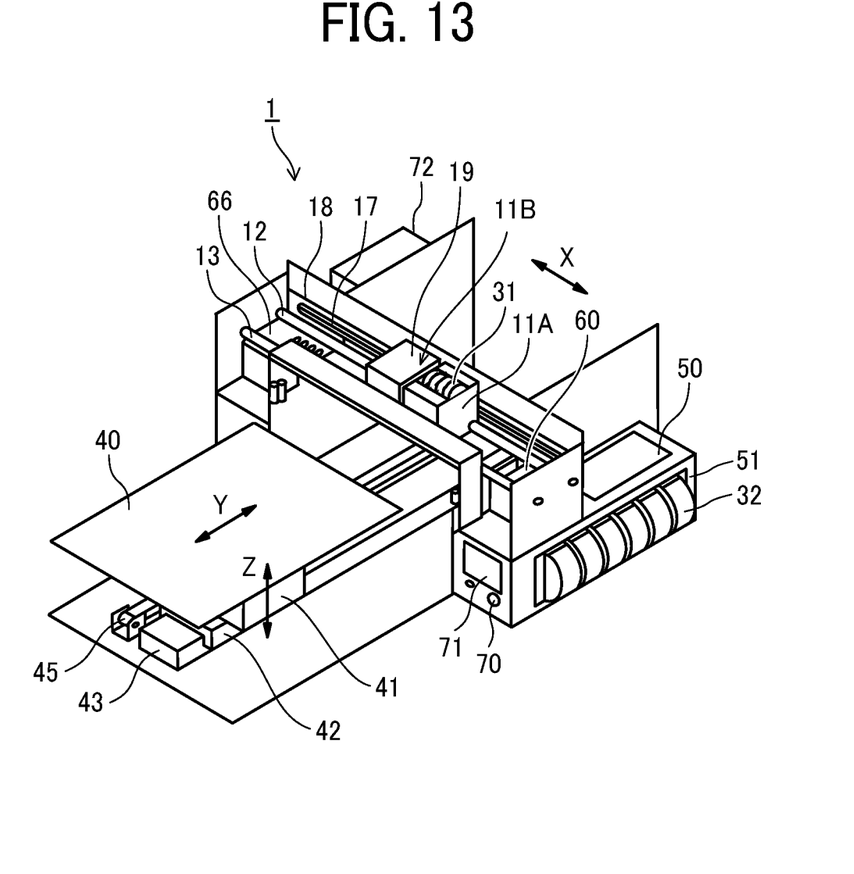
FIG. 13 is a schematic perspective view of a printer according to a fifth embodiment of the present disclosure.

FIG. 13 is a schematic perspective view of the printer 1 according to a fifth embodiment of the present disclosure.

The printer 1 according to the fifth embodiment includes a first carriage 11A and a second carriage 11B. For example, the first carriage 11A mounts the cartridge 31 as the first storage container and the head 20. The second carriage 11B mounts the head 20 including the sub tank 21. Liquid is supplied from the main tank 32 as the second storage container to the sub tank 21. The second carriage 11B includes a cover 19 that coves an upper surface of the second carriage 11B.

Thus, the printer 1 can prevent attempts to mistakenly replace the sub tank 21 on the second carriage 11B when the cartridge 31 is replaced.

When the printer 1 includes a plurality of carriages 11, the printer 1 may include the first carriage 11A including a mixture of the cartridge 31 on the carriage 11 (on-carriage cartridge) and a storage container other than the on-carriage cartridge and the second carriage 11B including only the cartridge 31 on the carriage 11 (on-carriage cartridge). The storage container other than the on-carriage cartridge may be the sub tank 21.

Further, the printer 1 according to the fifth embodiment includes two carriages 11 arranged side by side on the same guides 12 and 13. However, the printer according to the fifth embodiment may include two carriages 11 held on different guides.

Further, a "movement of the carriage 11" in the present embodiments includes not only a reciprocal movement during printing but also slight vibration of the carriage 11 to stir the liquid in the cartridge 31 (storage container) mounted on the carriage 11. The printer 1 can move the carriage 11 in the main scanning direction X to stir (agitate) the liquid in the cartridge 31 (storage container) mounted on the carriage 11.

The holder is a tray in the above embodiments, however, the holder may be a cassette detachable to the printer, for example.

Although the printer in the above-described embodiments prints on the fabric, an object to be printed is not limited to the fabric. Further, the printer according to the present embodiments may also be applied to a printer that sets an object to be printed other than a fabric on a holder to print an image on the object to be printed.

The term "liquid discharge apparatus" used herein also represents an apparatus including the head or the liquid discharge device to discharge liquid by driving the head. The liquid discharge apparatus may be, for example, an apparatus capable of discharging liquid to a material onto which liquid can adhere and an apparatus to discharge liquid toward gas or into liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate.

Examples of the "material on which liquid can adhere" include recording media, such as paper sheet, recording paper, recording sheet of paper, film, and cloth, electronic component, such as electronic substrate and piezoelectric element, media, such as powder layer, organ model, and testing cell, a car body, and construction materials.

The "material on which liquid can adhere" includes any material on which liquid can adhere, unless particularly limited.

Examples of the "material onto which liquid can adhere" include any materials on which liquid can adhere even temporarily, such as paper, thread, fiber, fabric, leather, metal, plastic, glass, wood, and ceramic.

Examples of the "liquid discharge apparatus" further include a treatment liquid coating apparatus to discharge a treatment liquid to a sheet to coat, with the treatment liquid, a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" used herein may be used synonymously with each other.

Each of the functions of the described embodiments such as the replacement controller 801 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid discharge apparatus comprising:
   an apparatus body;
   a liquid discharger to discharge a liquid;
   a carriage in the apparatus body to movably mount the liquid discharger;
   a first storage container detachably attached to the carriage to store a first liquid; and
   a second storage container detachably attached to the apparatus body to store a second liquid different from the first liquid.

2. The liquid discharge apparatus according to claim 1, wherein the first storage container directly supplies the first liquid to the liquid discharger on the carriage; and
   the second storage container supplies the second liquid to the liquid discharger on the carriage via a supply tube.

3. The liquid discharge apparatus according to claim 2, wherein the first storage container is connected to the liquid discharger to form a single unit.

4. The liquid discharge apparatus according to claim 2, further comprising:
   a sub tank on the carriage, the sub tank connected to the second storage container via the supply tube to store the second liquid supplied from the second storage container,
   wherein the liquid discharger includes:
   a first head to discharge the first liquid directly supplied from the first storage container; and
   a second head connected to the sub tank to discharge the second liquid supplied from the sub tank.

5. The liquid discharge apparatus according to claim 1, wherein the first storage container includes a plurality of first storage containers.

6. The liquid discharge apparatus according to claim 1, wherein a capacity of the first storage container is smaller than a capacity of the second storage container.

7. The liquid discharge apparatus according to claim 1, wherein a capacity of the first storage container is larger than a capacity of the second storage container.

8. The liquid discharge apparatus according to claim 1, wherein the first liquid stored in the first storage container is a liquid of at least one of white, gold, and silver colors.

9. The liquid discharge apparatus according to claim 1, wherein the first liquid stored in the first storage container contains at least one of a white pigment and a metallic pigment.

10. The liquid discharge apparatus according to claim 1, wherein the first liquid stored in the first storage container contains titanium oxide.

11. The liquid discharge apparatus according to claim 1, wherein a density of the first liquid stored in the first storage container is larger than a density of the second liquid stored in the second storage container.

12. The liquid discharge apparatus according to claim 1, wherein a density of pigments contained in the first liquid stored in the first storage container is larger than a density of pigments contained in the second liquid stored in the second storage container.

13. A printer comprising the liquid discharge apparatus according to claim 1, wherein the liquid discharger discharges a liquid onto a print target to form an image on the print target.

14. A liquid discharge apparatus comprising:
an apparatus body;
a liquid discharger to discharge a liquid;
a carriage in the apparatus body to movably mount the liquid discharger;
a first storage container detachably attached to the carriage to store a first liquid;
a second storage container detachably attached to the apparatus body to store a second liquid different from the first liquid, and
a third storage container detachably attached to the carriage from which the first storage container has been detached, the third storage container configured to store a third liquid different from the first liquid and the second liquid.

15. The liquid discharge apparatus according to claim 14, further comprising:
circuitry configured to drive the liquid discharger to discharge the first liquid in the liquid discharger to replace the first liquid in the liquid discharger with the third liquid in the third storage container.

* * * * *